United States Patent [19]
Iwata et al.

[11] Patent Number: 6,042,974
[45] Date of Patent: Mar. 28, 2000

[54] PRODUCTION PROCESSES OF COLOR FILTER AND LIQUID CRYSTAL DISPLAY DEVICE

[75] Inventors: Kenichi Iwata, Tokyo; Fumitaka Yoshimura; Hiroyuki Suzuki, both of Yokohama; Nagato Osano, Kawasaki; Junichi Sakamoto, Yokohama, all of Japan

[73] Assignee: Canon Kabushiki Kaisha, Tokyo, Japan

[21] Appl. No.: 08/906,160

[22] Filed: Aug. 5, 1997

[30] Foreign Application Priority Data

| Aug. 8, 1996 | [JP] | Japan | 8-209789 |
| Sep. 13, 1996 | [JP] | Japan | 8-243195 |
| Jul. 31, 1997 | [JP] | Japan | 9-206328 |

[51] Int. Cl.[7] ............................ G02B 5/20; G02F 1/1335
[52] U.S. Cl. ............................ 430/7; 430/321; 347/106; 427/164
[58] Field of Search ................... 430/7, 321; 349/106, 349/110; 347/106; 427/164

[56] References Cited

U.S. PATENT DOCUMENTS 5,340,619  8/1994  Chen et al. ............................ 424/498

FOREIGN PATENT DOCUMENTS

| 0 665 449 | 8/1995 | European Pat. Off. . |
| 0702250 | 3/1996 | European Pat. Off. . |
| 59-178416 | 10/1984 | Japan . |
| 4121702 | 4/1992 | Japan . |
| 5-241011 | 9/1993 | Japan . |
| 5-288913 | 11/1993 | Japan . |
| 6-347637 | 12/1994 | Japan . |
| 6347637 | 12/1994 | Japan . |
| 7035915 | 2/1995 | Japan . |
| 7035917 | 2/1995 | Japan . |
| 8-166507 | 6/1996 | Japan . |
| 8-179110 | 7/1996 | Japan . |
| 8-179113 | 7/1996 | Japan . |
| 9-033711 | 2/1997 | Japan . |

*Primary Examiner*—John A. McPherson
*Attorney, Agent, or Firm*—Fitzpatrick, Cella, Harper & Scinto

[57] ABSTRACT

Disclosed herein is a process for producing a color filter, which comprises the steps of forming a black matrix pattern with a resin on a transparent base, conducting a surface-state-modifying treatment to increase surface energy of the surface of the base at areas corresponding to spaces of the black matrix pattern, and applying inks to the portions of the base corresponding to the spaces of the black matrix pattern.

18 Claims, 2 Drawing Sheets

PRODUCTION PROCESSES OF COLOR FILTER AND LIQUID CRYSTAL DISPLAY DEVICE

BACKGROUND OF THE INVENTION

1. Field of the Invention

The present invention relates to a production process of a color filter, and particularly to a production process of a color filter making use of an ink-jet printing method. The color filters produced in the present invention are used in the field of color liquid crystal display devices and the like.

The present invention also relates to a production process of a liquid crystal display device.

2. Related Background Art

With the advancement of personal computers, particularly, portable personal computers in recent years, the demand for liquid crystal display devices, particularly, color liquid crystal display devices increases. It is however necessary to greatly reduce the cost of the color liquid crystal display devices for further spreading them. There is a demand for reduction in the cost of color filters particularly given much weight from the viewpoint of the cost.

As a process for producing a color filter at low cost, it is proposed to form light-screening black matrices on a glass base and apply inks toward spaces between the black matrices using an ink-jet printer, thereby coloring portions of the base corresponding to the spaces. With respect to this process, materials hard to wet with inks and easy to repel the inks are investigated as materials for black matrices in order to successfully fill the inks in space areas between the black matrices, which correspond to respective pixels.

For example, Japanese Patent Application Laid-Open No. 7-35917 proposes a process in which a material for black matrices having a contact angle with inks of at least 20° is used to form black matrices, and the inks are ejected toward space areas between the black matrices. In Japanese Patent Application Laid-Open No. 7-35915, it is proposed to use a material having a contact angle with water of at least 40° as a material for black matrices. In Japanese Patent Application Laid-Open No. 6-347637, it is proposed to adjust critical surface tensions of a base surface, inks and a black matrix surface so as to be the base surface>the inks>the black matrix surface, and to preset their critical surface tensions in such a manner that the black matrix surface is lower than 35 dyn/cm, the base surface is not lower than 35 dyn/cm, and the inks are different by at least 5 dyn/cm from both the base surface and the black matrix surface. In all these examples, it is proposed to contain a fluorine compound or a silicon compound in materials for the black matrices to impart a high water repellency to the materials.

Besides, Japanese Patent Application Laid-Open No. 4-121702 proposes a process for forming banks having a solvophilicity opposite to a base and charging inks between banks. However, detailed description as to materials is not made.

When a fluorine compound or a silicon compound, which is a water repellent, is mixed into a material for black matrices like these examples, however, the water repellent in the material for black matrices is evaporated upon post baking, which is a final step for forming a black matrix pattern, to thinly attach to the surface of a glass base corresponding to the spaces between black matrices. On the other hand, even when no water repellent is added, low molecular organic substances contained in the material for black matrices are evaporated to attach to the glass surface likewise. In each case, the glass surface comes to exhibit water repellency, which causes a problem that when inks are applied to portions of the glass base corresponding to the spaces between black matrices, said portions being to serve as pixels, the inks are prevented from attaching thereto.

SUMMARY OF THE INVENTION

The present invention has been completed in view of the foregoing circumstances and has as its object the provision of a process for producing a color filter, by which no ink cissing occurs upon applying color inks to space areas between black matrices by ink-jet or the like to evenly color them, thereby producing a color filter free of defects and irregularities and high in contrast, and of a process for producing a liquid crystal display device equipped with such a color filter.

The above object can be achieved by the present invention described below.

According to the present invention, there is thus provided a process for producing a color filter, which comprises the steps of: forming a black matrix pattern with a resin on a transparent base; conducting a surface-modifying treatment to increase surface energy of the surface of the base at areas corresponding to spaces of the black matrix pattern; and applying inks to the portions of the base corresponding to the spaces of the black matrix pattern.

According to the present invention, there is also provided a process for producing a liquid crystal display device, which comprises the steps of: forming a color filter substrate via the steps of forming a black matrix pattern with a resin on a transparent base, conducting a surface-modifying treatment to increase surface energy of the surface of the base at areas corresponding to spaces of the black matrix pattern, and applying inks to the portions of the base corresponding to the spaces of the black matrix pattern; arranging an opposite base having pixel electrodes in opposition to the color filter substrate; and enclosing a liquid crystal composition in a space between the color filter substrate and the opposite base.

DETAILED DESCRIPTION OF THE PREFERRED EMBODIMENTS

Figure 1A:
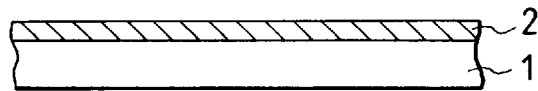
FIGS. 1A, 1B, 1C, 1D, 1E, 1F and 1G illustrate the steps of producing a color filter according to the present invention.
Figure 1B:
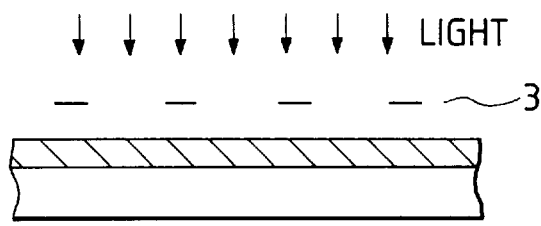
Figure 1C:
Figure 1D:
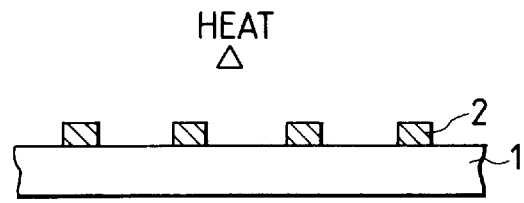
Figure 1E:
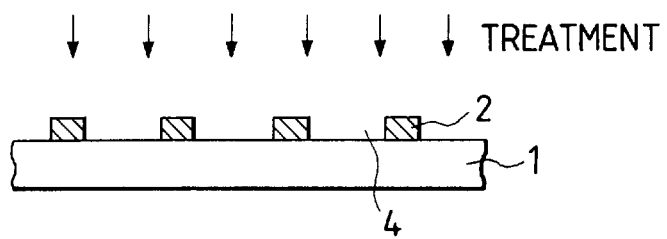
Figure 1F:
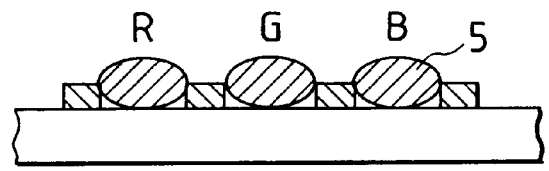
Figure 1G:
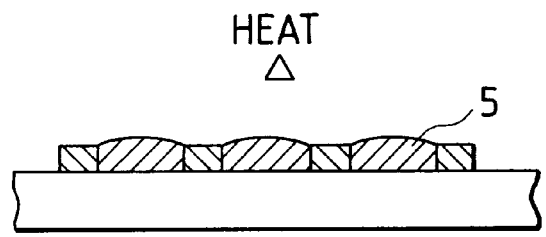

In order to prevent inks situated at adjoining pixel areas from mixing with each other beyond a black matrix when portions of a base corresponding to spaces between black matrices are colored with red, green and blue inks in the production of a color filter, it is necessary that the black matrices are formed with a material hard to wet, namely, they have surface energy lower than that of the inks. On the other hand, in order to fully spread inks over respective pixel areas partitioned by the black matrices to obtain a color filter good in contrast, it is necessary that the surfaces of the pixel areas are easy to wet with inks, namely, the surface energy of the pixel areas is higher than that of the inks. Accordingly, it is necessary that a certain difference of wettability to inks arises between the black matrices and the pixel areas partitioned by the black matrices. The wettability can be expressed by surface energy or contact angle with water.

According to the present invention, even when a difference in surface energy between black matrices and space areas partitioned by the black matrices is made smaller due to a step of heating the black matrices at a high temperature, such as post baking upon formation of the black matrices, the surface energy of the space areas between the black matrices can be increased (the contact angle with water can be made small) by conducting a surface-modifying treatment to make a difference in surface energy between the space areas and the black matrices greater. Therefore, the present invention permits application of color inks to the space areas between the black matrices to evenly color the space areas without causing any ink cissing, thereby producing a color filter free of defects and irregularities and high in contrast.

As a material for forming the black matrices in the present invention, either a black photosensitive resin composition or a black nonphotosensitive resin composition may be used. In order to enhance a water repellency, it is preferable to use a resin having a group easy to be decomposed in a subsequent step, such as a methyl group, on its side chain. Such a material is a material for black matrices, which generally requires a heat treatment for formation of the black matrices, and is such that a water repellent, unreacted substances (for example, a photopolymerization initiator and a monomer component), a silane coupling agent added for enhancing adhesion to a base, an organic solvent as a solvent, and the like are evaporated from the material for black matrices during the heat treatment to enhance the water repellency of the space areas between the black matrices, thereby deteriorating their wettability to inks. However, such a material may be suitably used in the present invention.

The black photosensitive resin composition comprises a black pigment or dye and a photosensitive material and may optionally contain a nonphotosensitive resin. The resin composition is dispersed in a mixed solvent composed of a low-boiling organic solvent and a high-boiling organic solvent when it is applied to a base.

Carbon black or a black organic pigment may be used as the black pigment.

The photosensitive material may be chosen for use from among UV resists, DEEP-UV resists, ultraviolet-curing-type resins and the like.

Examples of the UV resists include negative-type resists such as cyclized polyisoprene-aromatic bisazide type resists and phenol resin-aromatic azide compound type resists, and positive-type resists such as novolak resin-diazonaphthoquinone type resists.

Examples of the DEEP-UV resists include positive-type resists, such as radiation-decomposable polymer resists such as poly(methyl methacrylate), poly(styrene sulfone), poly(hexafluorobutyl methacrylate), poly(methyl isopropenyl ketone) and brominated poly(1-trimethyl-silylpropyn), and dissolution inhibitor type positive-type resists such as o-nitrobenzyl cholates; and negative-type resists such as poly(vinylphenol-3,3'-diazide diphenyl sulfone) and poly (glycidyl methacrylate).

Examples of the ultraviolet-curing-type resins include polyester acrylates, polyepoxy acrylates and polyurethane acrylates, which contain about 2 to 10% by weight of one or more photopolymerization initiators selected from among benzophenone and substituted derivatives thereof, benzoin and substituted derivatives thereof, acetophenone and substituted derivatives thereof, and oxime-type compounds formed from benzil and the like.

A water repellent may be contained in the black matrices to enhance the water repellency thereof.

In the case where such a black photosensitive resin composition is used, a color filter may be produced, for example, in accordance with such a series of steps as illustrated in FIGS. 1A to 1G. Incidentally, FIGS. 1A to 1G correspond to the following steps (a) to (g), respectively.

(a) A black photosensitive resin composition 2 is applied to a transparent base 1. As a coating method, various methods such as spin coating, die coating and dip coating may be used. The thickness of the coating film is a thickness sufficient to obtain necessary light-screening ability and is, for example, about 1 μm. As the transparent base, for example, glass is often used. However, a plastic film or sheet may be used. As needed, a thin film for enhancing adhesion may be formed in advance on the transparent base to enhance the adhesion of the transparent base to black matrices and color inks.

(b) The coated layer 2 is precured using, for example, a hot plate, and exposed using an exposure system, which emits light of a wavelength corresponding to the sensitivity of the photosensitive resin composition, and a mask 3 having a predetermined pattern.

(c) When the photosensitive resin composition is of a negative-type, portions of the coated layer 2, which have been screened by the mask upon the exposure system, are dissolved out in a developing solution by development to bare the surface of the base, and the exposed portions are left as a black matrix pattern 2. The thus-developed coating film is rinsed to wash out the developing solution.

(d) The remaining coated layer is subjected to a heating and drying treatment (post baking) to completely cure the coated layer, thereby forming black matrices. In the present invention, the complete curing means a treatment by which a solvent component in the black matrices is almost evaporated, and the black matrices are adhered firmly to the surface of the base.

(e) The surface of the glass base corresponding to the space areas 4 between the black matrices is subjected to a surface-state-modifying treatment. The surface-state-modifying treatment is preferably conducted right before application of inks.

(f) Inks 5 of predetermined colors, for example R (red), G (green) and B (blue), are applied to the space areas between the black matrices. As a method of applying the inks, there may be used a commonly used printing method such as offset printing, gravure printing or screen printing. However, it is particularly preferable to use ink-jet printing using an ink-jet printer in that since no printing plate is used upon printing, high-precision patterning can be performed by controlling the diameter of an ink droplet. As inks used herein, inks easy to be repelled by the black matrices and easy to wet pixel areas situated between the black matrices may be suitably chosen for use. The surface energy (surface tension) of the inks is generally within a range of from 30 to 70 dyn/cm. Such inks may be either dye-based inks or pigment-based inks. The solvent for the inks is composed mainly of water and may contain a hydrophilic organic solvent and the like.

It is preferable to use thermosetting-type inks as the inks because there is no need to provide special means other than heating means.

A material settable under the same temperature conditions as in the complete curing of the black matrices is preferred as a thermosetting component contained in the inks. It may be suitably chosen for use from among acrylic resins, epoxy resins, phenol resins, enethiol and the like. Besides, those obtained by introducing an aromatic amine, an acid anhydride or the like into the above resins may also be used according to the process temperature required.

(g) The inks are completely set by heating.

In the step (d) among the above steps, heating is carried out at, generally, about 150 to 250° C. Therefore, the water repellent component or other organic components are evaporated from the material for the black matrices to attach to the glass surface at the pixel areas. For this reason, the glass surface at the space areas between the black matrices become a state too hard to wet with the inks to fully spread the inks thereon. However, when the surface-state-modifying treatment of the step (e) is conducted to remove the water repellent component attached to the glass surface, a surface easy to wet can be obtained.

On the other hand, a nonphotosensitive resin composition containing a black pigment or dye and a nonphotosensitive resin may also be used as the material for forming the black matrices. The black nonphotosensitive resin composition is dispersed in a suitable solvent when it is applied to the base.

Examples of the nonphotosensitive resin used include polyimide, acrylic monomers and urethane acrylates.

In the production steps of a color filter in this case, a black matrix pattern can be formed by forming a coated film of the black nonphotosensitive resin composition in a thickness of about 1 $\mu$m on the base in the same manner as in the case where the photosensitive resin composition is used, and thereafter using the photoresist as a mask and etching the material for the black matrices. The pattern may also be formed by lift-off using a photoresist. Thereafter, the color filter can be produced in accordance with the above-described step (d) and subsequent steps.

The surface-state-modifying treatment related to the present invention means all methods by which the surface energy (generally determined by the Zisman Plot method) of the glass base corresponding to the space areas between the black matrices can be increased, and more particularly methods by which the surface energy of the glass base corresponding to the space areas between the black matrices is increased, so that a difference in contact angle with water between the black matrices and the portions of the glass base corresponding to the space areas amounts to at least 15°, preferably at least 40°.

Examples of such methods include a cleaning treatment, a UV-ozone treatment, a corona discharge treatment and an etching treatment of a base surface.

As the cleaning treatment, an alkali cleaning treatment is preferred. Examples thereof may include cleaning using a commercially available cleaning agent such as Sun Wash TL-30 (trade name, product of Lion Corporation), CM-10L (trade name, product of NEOS Company Limited) or DK B-Clear CW-5524 (trade name, product of Dai-ichi Kogyo Seiyaku Co., Ltd.) or an alkaline surfactant such as ethylenediamine.

The UV-ozone treatment is a treatment using an apparatus which generates ozone by UV, by which the water repellent component and organic components on the base surface are removed by the effect of UV and/or ozone. Since the water repellency of the black matrix surface is also reduced to some extent by this treatment, a heat treatment may be conducted after the UV-ozone treatment to restore the water repellency of the black matrix surface. Thereafter, alkali cleaning may be further conducted to remove the water repellent component and organic components attached again by this heat treatment. In any event, this heat treatment and the subsequent alkali cleaning treatment are optionally conducted so as to make a difference in surface energy between the black matrix surface and the surface of the glass base corresponding to the space areas partitioned by the black matrices as great as possible, thereby making their surfaces optimum surface profiles according to the surface energy of the inks used.

The corona discharge treatment is a treatment using a corona discharge device to remove the water repellent component and organic components on the base surface. In this case, a heat treatment and a subsequent alkali cleaning treatment may also be subsequently conducted in the same manner as described above.

The etching treatment is a treatment for removing the water repellent component attached to the glass surface to make the surface easy to wet with the inks.

No particular limitation is imposed on the degree of etching so far as the water repellent component attached to the surface of the transparent base is removed, whereby the base surface can be made easy to wet with the inks. However, the degree of etching is preferably 0.05 to 0.15 $\mu$m. If the degree of etching is less than 0.05 $\mu$m, it often becomes insufficient, so that color irregularities tends to occur upon coloring due to insufficient wetting of the surfaces of the pixel areas. On the other hand, any degree exceeding 0.15 $\mu$m permits the achievement of uniform wetting, but it takes a longer time to etch, so that increase in production cost is brought on in a mass production.

As a process of etching the transparent base, a wet process using an acid or alkali is preferred from the viewpoint of cost, while a dry etching process such as reactive ion etching or reverse sputtering is preferred from the viewpoint of reproducibility and the like.

Figure 2:
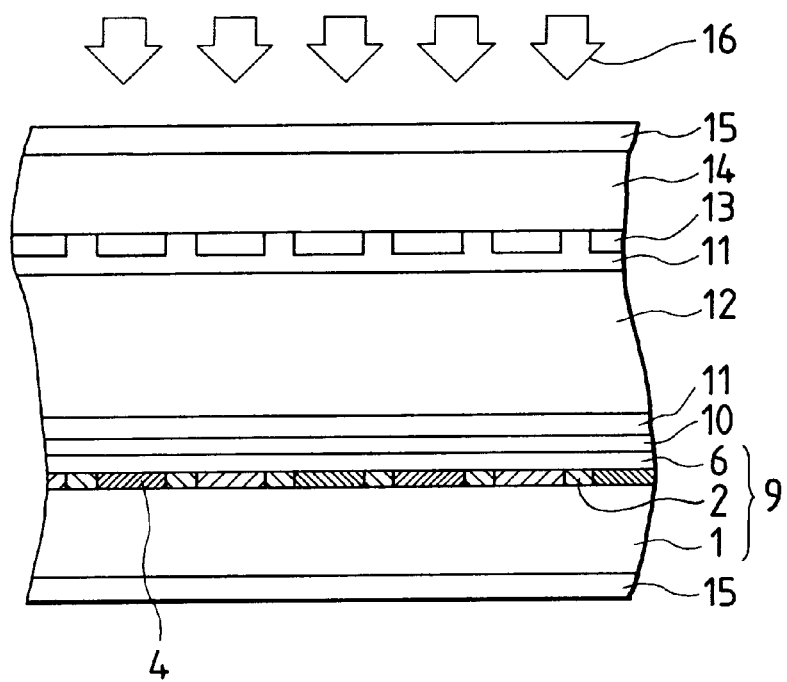
FIG. 2 is a cross-sectional view illustrating the construction of a liquid crystal display device.

FIG. 2 illustrates a cross section of a TFT color liquid crystal display device in which the color filter according to the present invention has been incorporated. Incidentally, the construction thereof is not limited to this embodiment.

The color liquid crystal display device is generally formed by uniting a color filter substrate 1 and a base 14 opposite thereto and enclosing a liquid crystal composition 12 in a space between them. TFT (not illustrated) and transparent pixel electrodes 13 are formed in the form of a matrix inside one base 14 of the liquid crystal display device. A color filter 9 is provided at a position opposite to the pixel electrodes 13 inside the other base 1 so as to arrange coloring materials of R, G and B. A transparent counter electrode (common electrode) 10 is formed over on the color filter 9. Black matrices are generally formed on the side of the color filter substrate. Alignment films 11 are further formed within the surfaces of both bases. Liquid crystal molecules can be aligned in a fixed direction by subjecting these films to a rubbing treatment. Polarizing plates 15 are bonded to the outer surfaces of both glass bases. The liquid crystal composition 12 is charged in a space (about 2 to 5 $\mu$m) between these glass bases. As a back light 16, a combination of a fluorescent lamp and a scattering plate (both, not shown) is generally used. The liquid crystal composition functions as a shutter for changing the transmittance of rays from the back light 16, thereby making a display. Incidentally, reference numerals 2, 4 and 6 designate black matrices, colored portions and a protective film, respectively.

The present invention will hereinafter be described in more detail by the following Examples.

EXAMPLE 1

After a glass base was subjected to alkali ultrasonic cleaning using a 2% aqueous solution of sodium hydroxide and then to a UV-ozone treatment, a resist material (a negative-type resist ink for black matrices, V-259 BK739P, trade name, product of Nippon Steel Chemical Co., Ltd.) comprising carbon black was applied to the glass base by a spin coater so as to give a film thickness of 1 μm. This base was heated at 80° C. for 180 seconds on a hot plate to precure the resist.

The resist film thus formed was subjected to proximity exposure system by means of a DEEP-UV exposure system and a mask having a predetermined pattern and then developed with a developing solution composed of an aqueous solution of an inorganic alkali using a spin developer. The thus-developed resist film was further rinsed with purified water to completely remove the developing solution, and heated at 200° C. for 30 minutes in a clean oven to completely cure the resist, thereby obtaining black matrices of a predetermined pattern.

In this state, the contact angle of the black matrix surface with water was measured. As a result, it was found that the contact angle was 75°, and the surface hence become a state hard to wet. On the other hand, the contact angle of the glass surface at spaces between the black matrices with water was 68°, and so its water repellency was high and did not differ much from that of the black matrix surface.

This base was subjected to a cleaning treatment for 10 minutes with a cleaning solution containing 3% of an alkaline surfactant (ultrasonic wave-combined cleaning agent for cleaning precision glass and lens, Siliron HS, trade name, product of Henkel Hakusui Corporation) by means of an ultrasonic cleaner. In this state, the contact angle of the black matrix surface with water was measured. As a result, it was found that the contact angle was 70° and not very changed, and the surface remained in the state hard to wet. On the other hand, the contact angle of the glass surface with water was 30°, and so its water repellency was markedly reduced and a difference in surface energy between both surfaces became greater.

Water-based inks each containing dyes of red, green and blue colors were each applied to the space areas of the black matrix pattern using an ink-jet apparatus to color portions of the base surface corresponding to the space areas. These inks were each prepared by dispersing a dye (suitably selected from among, for example, anthraquinone dyes, azo dyes, triphenylmethane dyes and polymethine dyes) in a resin (self-crosslinking thermosetting resin composed mainly of acrylic-silicone graft polymer), dissolving this dispersion in a solvent (for example, isopropyl alcohol, ethylene glycol or N-methyl-2-pyrrolidone) and adding a surface tension adjustor (Acetylenol EH, trade name, product of Kawaken Fine Chemicals Co., Ltd.) to the solution. The inks had surface energy of 32 dyn/cm.

The inks evenly covered the base surface at the space areas between the black matrices, and defective results such as bleeding, runout, color mixing between adjoining pixel areas and blank areas were not observed. After the thus-colored base was then subjected to a heat treatment to set the inks, a protective film was formed thereon, afterward, a transparent conductive film was formed on above-mentioned (protective) film. In this case, the protective film was excellent in adhesion, and so no inconvenience arose. The color filter thus produced was used to fabricate a liquid crystal display device illustrated in FIG. 2. As a result, a liquid crystal display device free of any defect and excellent in color properties was obtained.

EXAMPLE 2

After a glass base was subjected to an alkali ultrasonic cleaning treatment using a 2% sodium hydroxide aqueous solution and then to a UV-ozone treatment, a resist material (a negative-type resist ink for black matrices, Color Mosaic CK-S171, trade name, product of Fuji Hunt K.K.) comprising carbon black was applied to the glass base by a spin coater so as to give a film thickness of 1 μm. This base was heated at 100° C. for 180 seconds on a hot plate to precure the resist.

The resist film thus formed was subjected to proximity exposure system by means of an i-ray exposure system and a mask having a predetermined pattern and then developed by dipping it in a developing solution composed of an aqueous solution of an inorganic alkali. Thereafter, the pattern was regulated into a complete form while spraying purified water under high pressure to conduct a rinsing treatment. The thus-treated base was heated at 200° C. for 30 minutes in a clean oven to completely cure the resist, thereby obtaining black matrices of a predetermined pattern.

In this state, the contact angle of the black matrix surface with water was measured and found to be 55°. On the other hand, the contact angle of the glass surface at spaces between the black matrices with water was 50°. Therefore, there was little difference in contact angle between both surfaces. At some places, the contact angle of the black matrix surface was smaller than that of the glass surface.

This base was subjected to a cleaning treatment for 10 minutes with a cleaning solution containing 3% of an alkaline surfactant (ultrasonic wave-combined cleaning agent for cleaning precision glass and lens, Siliron HS, trade name, product of Henkel Hakusui Corporation) by means of an ultrasonic cleaner. In this state, the contact angle of the black matrix surface with water was measured and was found to be 52°. On the other hand, the contact angle of the glass surface with water was 36°, and so its water repellency was reduced and a difference in surface energy between both surfaces became greater.

Water-based inks each containing dyes of red, green and blue colors were each applied to the space areas of the black matrix pattern using an ink-jet apparatus to color portions of the base surface corresponding to the space areas. These inks were each prepared by dispersing a dye (suitably selected from among, for example, anthraquinone dyes, azo dyes, triphenylmethane dyes and polymethine dyes) in a resin (self-crosslinking acrylic acid-acrylic ester emulsion), dissolving this dispersion in a solvent (for example, isopropyl alcohol, ethylene glycol or N-methyl-2-pyrrolidone) and adding a surface tension adjustor (Acetylenol EH) to the solution. The inks had surface energy of 48 dyn/cm.

The inks evenly covered the base surface at the space areas between the black matrices, and defective results such as bleeding, runout, color mixing between adjoining pixel areas and blank areas were not observed. After the thus-colored base was then subjected to a heat treatment to set the inks, a protective film was formed thereon, afterward, a transparent conductive film was formed on above-mentioned (protective) film. In this case, the protective film was excellent in adhesion, and so no inconvenience arose. The color filter thus produced was used to fabricate a liquid crystal display device illustrated in FIG. 2. As a result, a liquid crystal display device free of any defect and excellent in color properties was obtained.

EXAMPLE 3

Black matrices were formed on a glass base using the same materials and process as those used in Example 1.

Contact angles of the black matrix surface with water and the glass surface at the space areas between the black matrices with water were 75° and 68°, respectively.

This base was subjected to a UV-ozone treatment for 3 minutes by means of a UV-ozone cleaner (Dry Cleaner ST3100, trade name, manufactured by Takizawa Sangyo K.K.). In this state, the contact angle of the black matrix surface with water was measured and was found to be 45°. On the other hand, the contact angle of the glass surface with water was 20°, and so a difference in surface energy between both surfaces became greater.

Water-based inks each containing dyes of red, green and blue colors were each applied to the space areas of the black matrix pattern using an ink-jet apparatus to color portions of the base surface corresponding to the space areas. These inks were each prepared by dispersing a dye (suitably selected from among, for example, anthraquinone dyes, azo dyes, triphenylmethane dyes and polymethine dyes) in a resin (self-crosslinking thermoseting resin composed mainly of acrylic-silicone graft polymer) and dissolving this dispersion in a solvent (for example, isopropyl alcohol, ethylene glycol or N-methyl-2-pyrrolidone). The inks had surface energy of 58 dyn/cm.

As with Example 1, in this example, the inks evenly covered the base surface at the space areas between the black matrices, and defective results such as bleeding, runout, color mixing between adjoining pixel areas and blank areas were not observed. After the thus-colored base was then subjected to a heat treatment to set the inks, a protective film was formed thereon, afterward, a transparent conductive film was formed on above-mentioned (protective) film. In this case, the protective film was excellent in adhesion, and so no inconvenience arose. The color filter thus produced was used to fabricate a liquid crystal display device illustrated in FIG. 2. As a result, a liquid crystal display device free of any defect and excellent in color properties was obtained.

EXAMPLE 4

Black matrices were formed on a glass base using the same materials and process as those used in Example 1.

This base was subjected to a UV-ozone treatment for 5 minutes by means of a UV-ozone cleaner (Dry Cleaner ST-3100, trade name, manufactured by Takizawa Sangyo K.K.) and then to a heat treatment at 220° C. for 10 minutes. In this state, the contact angle of the black matrix surface with water was measured and was found to be 53°. On the other hand, the contact angle of the glass surface with water was 11°, and so a difference in surface energy between both surfaces became greater.

The inks used in Example 3 were each applied toward the space areas of the black matrix pattern by means of an ink-jet apparatus to color portions of the base surface corresponding to the space areas.

As with Example 1, in this example, the inks evenly covered the base surface at the space areas between the black matrices, and defective results such as bleeding, runout, color mixing between adjoining pixel areas and blank areas were not observed. After the thus-colored base was then subjected to a heat treatment to set the inks, a protective film was formed thereon, afterward, a transparent conductive film was formed on above-mentioned (protective) film. In this case, the protective film was excellent in adhesion, and so no inconvenience arose. The color filter thus produced was used to fabricate a liquid crystal display device illustrated in FIG. 2. As a result, a liquid crystal display device free of any defect and excellent in color properties was obtained.

EXAMPLE 5

Black matrices were formed on a glass base using the same materials and process as those used in Example 2.

The base was subjected to a UV-ozone treatment for 5 minutes by means of a UV-ozone cleaner (Dry Cleaner ST-3100, trade name, manufactured by Takizawa Sangyo K.K.) and then to a heat treatment at 220° C. for 10 minutes. The thus-treated base was further subjected to ultrasonic cleaning for 10 minutes using a cleaning solution containing 3% of an alkaline surfactant.

In this state, the contact angle of the black matrix surface with water was measured and was found to be 55°. On the other hand, the contact angle of the glass surface at the space areas between the black matrices with water was 5°, and so a considerable difference of surface energy could be made between both surfaces.

The same dye-based inks of red, green and blue colors having surface energy of 58 dyn/cm as those used in Example 3 were each applied toward the space areas of the black matrix pattern by means of an ink-jet apparatus to color portions of the base surface corresponding to the space areas.

As with Example 1, in this example, the inks evenly covered the base surface at the space areas between the black matrices, and defective results such as bleeding, runout, color mixing between adjoining pixel areas and blank areas were not observed. After the thus-colored base was then subjected to a heat treatment to set the inks, a protective film was formed thereon, afterward, a transparent conductive film was formed on above-mentioned (protective) film. In this case, the protective film was excellent in adhesion, and so no inconvenience arose. The color filter thus produced was used to fabricate a liquid crystal display device illustrated in FIG. 2. As a result, a liquid crystal display device free of any defect and excellent in color properties was obtained.

EXAMPLE 6

After a glass base was subjected to a UV-ozone treatment and then to an alkali cleaning treatment using a 2% sodium hydroxide aqueous solution, a resist material (a negative-type resist ink for black matrices, CFPR BK-729S, trade name, product of Tokyo-Ohka Kogyo KK) comprising carbon black was applied to the base by a spin coater so as to give a film thickness of 1 µm.

This base was then heated at 90° C. for 180 seconds on a hot plate to pre-cure the resist.

Contact angles of the black matrix surface with water and the glass surface at the space areas between the black matrices with water were 80° and 68°, respectively.

The base was subjected to a corona discharge treatment (electric current: 4A; distance between an electrode and the base: 10 mm) for 3 minutes by means of a corona discharge device (High-Frequency Power Source HFSS-103, trade name, manufactured by Kasuga Denki K.K.). In this state, the contact angle of the black matrix surface with water was measured and was found to be 60°. On the other hand, the contact angle of the glass surface with water was 15°, and so a sufficient difference in surface energy arose between both surfaces.

Dye-based inks of red, green and blue colors as used in Example 2 having surface energy of 48 dyn/cm were each applied to the space areas of the black matrix pattern using an ink-jet apparatus to color portions of the base surface corresponding to the space areas.

As similar to Example 1, the inks fully and evenly spread over the portions of the base surface corresponding to the space areas between the black matrices, and defective results such as bleeding, runout, color mixing between adjoining pixel areas and blank areas were not observed.

The thus-colored base was then subjected to a heat treatment to set the inks, and a protective film was applied thereto to form a transparent conductive film. The protective film was excellent in adhesion, and so no inconvenience arose.

The color filter thus produced was used to fabricate a liquid crystal display device illustrated in FIG. 2. As a result, a liquid crystal display device free of any defect and excellent in color properties was obtained.

EXAMPLE 7

Black matrices were formed on a glass base using the same materials and process as those used in Example 1.

The base was subjected to a corona discharge treatment (electric current: 4A; distance between an electrode and the base: 10 mm) for 5 minutes by means of a corona discharge device (High-Frequency Power Source HFSS-103, trade name, manufactured by Kasuga Denki K.K.) and then to a heat treatment at 220° C. for 10 minutes. In this state, the contact angle of the black matrix surface with water was measured and was found to be 72°. On the other hand, the contact angle of the glass surface with water was 8°, and so a sufficient difference in surface energy arose between both surfaces.

The same dye-based inks of red, green and blue colors having surface energy of 48 dyn/cm as those used in Example 2 were each applied toward the space areas of the black matrix pattern by means of an ink-jet apparatus to color portions of the base surface corresponding to the space areas.

As with Example 1, in this example, the inks evenly covered the base surface at the space areas between the black matrices, and defective results such as bleeding, runout, color mixing between adjoining pixel areas and blank areas were not observed. After the thus-colored base was then subjected to a heat treatment to set the inks, a protective film was formed thereon, afterward, a transparent conductive film was formed on above-mentioned (protective) film. In this case, the protective film was excellent in adhesion, and so no inconvenience arose. The color filter thus produced was used to fabricate a liquid crystal display device illustrated in FIG. 2. As a result, a liquid crystal display device free of any defect and excellent in color properties was obtained.

EXAMPLE 8

Black matrices were formed on a glass base using the same materials and process as those used in Example 1.

The base was subjected to a corona discharge treatment (electric current: 4A; distance between an electrode and the base: 10 mm) for 5 minutes by means of the same corona discharge device as that used in Example 7 and subsequently to a heat treatment at 220° C. for 10 minutes. This base was subjected to a ultrasonic cleaning treatment for 10 minutes with a cleaning solution containing 3% of an alkaline surfactant (ultrasonic wave-combined cleaning agent for cleaning precision glass and lens, Siliron HS, trade name, product of Henkel Hakusui Corporation).

In this state, the contact angle of the black matrix surface with water was measured and was found to be 46°. On the other hand, the contact angle of the glass surface with water was 6°, and so a sufficient difference in surface energy arose between both surfaces.

The same dye-based inks of red, green and blue colors having surface energy of 58 dyn/cm as those used in Example 3 were each applied toward the space areas of the black matrix pattern by means of an ink-jet apparatus to color portions of the base surface corresponding to the space areas.

As with Example 1, in this example, the inks evenly covered the base surface at the space areas between the black matrices, and defective results such as bleeding, runout, color mixing between adjoining pixel areas and blank areas were not observed. After the thus-colored base was then subjected to a heat treatment to set the inks, a protective film was formed thereon, afterward, a transparent conductive film was formed on above-mentioned (protective) film. In this case, the protective film was excellent in adhesion, and so no inconvenience arose. The color filter thus produced was used to fabricate a liquid crystal display device illustrated in FIG. 2. As a result, a liquid crystal display device free of any defect and excellent in color properties was obtained.

EXAMPLE 9

Procedures before the surface-state-modifying treatment in Example 1 were repeated in the same manner as in Example 1 except that a material obtained by adding 1% by weight of a fluorine compound water repellent (Flolard FC430, trade name, Sumitomo 3M Limited) to a resist material (a negative-type resist ink for black matrices, V-257 BK739P, trade name, product of Nippon Steel Chemical Co., Ltd.) was used as a material for black matrices, thereby forming black matrices on a glass base.

In this state, the contact angle of the black matrix surface with water was measured. As a result, it was found that the contact angle was 88°, and the surface hence become a state hard to wet. However, the glass surface also became a state hard to wet like the black matrix surface as demonstrated by its contact angle with water of 78°.

Thereafter, a surface-state-modifying treatment was conducted by a corona discharge treatment in the same manner as in Example 7, followed by a heat treatment at 220° C. for 10 minutes. As a result, the contact angle of the black matrix surface with water was 70°, while the contact angle of the glass surface with water was 41°, and so a sufficient difference in surface energy arose between both surfaces.

The same water-based inks each containing dyes of red, green and blue colors having surface energy of 32 dyn/cm as those used in Example 1 were each applied toward the space areas of the black matrix pattern by means of an ink-jet apparatus to color portions of the base surface corresponding to the space areas.

As with Example 1, in this example, the inks evenly covered the base surface at the space areas between the black matrices, and defective results such as bleeding, runout, color mixing between adjoining pixel areas and blank areas were not observed. After the thus-colored base was then subjected to a heat treatment to set the inks, a protective film was formed thereon, afterward, a transparent conductive film was formed on above-mentioned (protective) film. In this case, the protective film was excellent in adhesion, and so no inconvenience arose. The color filter thus produced was used to fabricate a liquid crystal display device illustrated in FIG. 2. As a result, a liquid crystal display device free of any defect and excellent in color properties was obtained.

COMPARATIVE EXAMPLE 1

Procedures before the surface-state-modifying treatment in Example 1 were repeated to form black matrices on a glass base. In this state, the contact angles of the black matrix surface and the glass surface at the space areas between the black matrices with water were the same as those before the surface-state-modifying treatment in Example 1 and were 75° and 68°, respectively, and so a difference in surface energy between both surfaces was little.

It was attempted to color the surface of this base corresponding to the space areas between the black matrices with the same dye-based inks as those used in Example 2 by means of an ink-jet apparatus. However, the inks were repelled at the glass surface corresponding to the space areas, and so the inks could not sufficiently wet the glass surface, nor spread over the pixel areas.

COMPARATIVE EXAMPLE 2

Procedures before the surface-state-modifying treatment in Example 1 were repeated in the same manner as in Example 1 except that a material obtained by adding 1% by weight of a fluorine compound water repellent (Flolard FC430, trade name, Sumitomo 3M Limited) to a resist material (a negative-type resist ink for black matrices, V-259 BK739P, trade name, product of Nippon Steel Chemical Co., Ltd.) was used as a material for black matrices, thereby forming black matrices on a glass base.

In this state, the contact angle of the black matrix surface with water was measured. As a result, it was found that the contact angle was 88°, and the surface hence become a state hard to wet. However, the glass surface also became a state hard to wet like the black matrix surface as demonstrated by its contact angle with water of 78°.

It was attempted to apply the same dye-based inks of red, green and blue colors as those used in Example 1 to the space areas between the black matrices by means of an ink-jet apparatus. However, the inks spread over the whole surface, so that the inks could not be filled in only the pixel areas.

COMPARATIVE EXAMPLE 3

Procedures before the surface-state-modifying treatment in Example 1 were repeated in the same manner as in Example 1 except that a material obtained by adding 0.5% by weight of a fluorine compound water repellent (Flolard FC430, trade name, Sumitomo 3M Limited) to a resist material (a negative-type resist ink for black matrices, V-259 BK739P, trade name, product of Nippon Steel Chemical Co., Ltd.) was used as a material for black matrices, thereby forming black matrices on a glass base.

In this state, the contact angle of the black matrix surface with water was measured. As a result, it was found that the contact angle was 80°, and the surface hence become a state hard to wet. The contact angle of the glass surface with water was 74°.

The surface of the base corresponding to the space areas between the black matrices was colored with the same dye-based inks of red, green and blue colors as those used in Example 3 by means of an ink-jet apparatus. As a result, it was observed that the inks were partially repelled at the glass surface corresponding to the space areas.

EXAMPLE 10

After a glass base was subjected to an alkali cleaning treatment and then to a UV-ozone treatment, a resist material (a negative-type resist ink for black matrices, BK739P, trade name, product of Nippon Steel Chemical Co., Ltd.) comprising a black material was applied to the base by a spin coater so as to give a film thickness of 1 $\mu$m.

This base was then heated at 80° C. for 180 seconds on a hot plate to pre-cure the resist. The resist film thus formed was then subjected to proximity exposure system by means of a mask having a predetermined pattern and a DEEP-UV exposure system. The thus-exposed resist film was then developed with a developing solution composed of an aqueous solution of an inorganic alkali using a spin developer, thereby forming a black matrix pattern. Thereafter, the thus-developed resist film was rinsed with purified water to completely remove the developing solution, and heated at 200° C. for 30 minutes in a clean oven to completely cure the resist.

After the above steps, the contact angle of the black matrix surface with water was measured. As a result, it was found that the contact angle was 75°, and the surface hence become a state hard to wet. On the other hand, the contact angle of the glass surface with water was 68°, and so a difference in contact angle with water between both surfaces was little.

As a subsequent step, the surface of the glass base was subjected to an etching treatment for 10 minutes with a 2% aqueous solution of NaOH kept at 50° C. The glass base was etched by about 0.1 $\mu$m from its surface by this treatment.

After the etching, the contact angle of the black matrix surface with water was measured. As a result, it was found that the contact angle was 70° and the surface remained in the state hard to wet. On the other hand, the contact angle of the glass surface with water was 10°, and so a difference in contact angle with water between both surfaces became greater.

Water-based inks each containing dyes of red, green and blue colors were each applied to the space areas of the black matrix pattern using an ink-jet apparatus to color portions of the base surface corresponding to the space areas. These inks used were each prepared by dispersing a dye in a resin and dissolving this dispersion in a solvent. The inks had surface energy of 32 dyn/cm. The inks fully and evenly spread over the portions of the base surface corresponding to the space areas between the black matrices, and defective results such as bleeding, runout, color mixing between adjoining pixel areas and blank areas were not observed.

The thus-colored base was then subjected to a heat treatment to set the inks, and a protective film was applied thereto to form a transparent conductive film. The protective film was excellent in adhesion, and so no inconvenience arose.

The color filter thus produced was used to fabricate a liquid crystal display device illustrated in FIG. 2. As a result, a liquid crystal display device free of any defect and excellent in color properties was obtained.

EXAMPLE 11

After a glass base was subjected to an alkali cleaning treatment and then to a UV-ozone treatment, a material obtained by mixing 1% by weight of a fluorine compound water repellent (Flolard FC430, trade name, Sumitomo 3M Limited) with a resist material (a negative-type resist ink for black matrices, BK739P, trade name, product of Nippon Steel Chemical Co., Ltd.) comprising a black material was applied to the glass base by a spin coater so as to give a film thickness of 1 $\mu$m.

This base was then heated at 80° C. for 180 seconds on a hot plate to pre-cure the resist. The resist film thus formed was then subjected to proximity exposure system by means of a mask having a predetermined pattern and a DEEP-UV exposure system. The thus-exposed resist film was then developed with a developing solution composed of an aqueous solution of an inorganic alkali using a spin developer, thereby forming a black matrix pattern. Thereafter, the thus-developed resist film was rinsed with purified water to completely remove the developing solution, and heated at 200° C. for 30 minutes in a clean oven to completely cure the resist.

After the above steps, the contact angle of the black matrix surface with water was measured. As a result, it was found that the contact angle was 80°, and the surface hence become a state hard to wet. On the other hand, the contact angle of the glass surface with water was 71°, and so a difference in contact angle with water between both surfaces was little.

As a subsequent step, the surface of the glass base was subjected to an etching treatment for 3 minutes with a 10% hydrogen fluoride aqueous solution kept at 40° C. The glass base was etched by about 0.15 µm from its surface by this treatment.

After the etching, the contact angle of the black matrix surface with water was measured. As a result, it was found that the contact angle was 75° and the surface remained in the state hard to wet. On the other hand, the contact angle of the glass surface with water was 13°, and so a difference in contact angle with water between both surfaces became greater.

Water-based inks each containing dyes of red, green and blue colors were then each applied to the space areas of the black matrix pattern using an ink-jet apparatus to color portions of the base surface corresponding to the space areas. These inks used were each prepared by dispersing a dye in a resin and dissolving this dispersion in a solvent. The inks had surface energy of 32 dyn/cm. The inks fully and evenly spread over the portions of the base surface corresponding to the space areas between the black matrices, and defective results such as bleeding, runout, color mixing between adjoining pixel areas and blank areas were not observed.

The thus-colored base was then subjected to a heat treatment to set the inks, and a protective film was applied thereto to form a transparent conductive film. The protective film was excellent in adhesion, and so no inconvenience arose.

The color filter thus produced was used to fabricate a liquid crystal display device illustrated in FIG. 2. As a result, a liquid crystal display device free of any defect and excellent in color properties was obtained.

EXAMPLE 12

After a glass base was subjected to an alkali cleaning treatment and then to a UV-ozone treatment, a resist material (a negative-type resist ink for black matrices, Color Mosaic CK-S 171, trade name, product of Fuji Hunt K.K.) comprising a black material was applied to the glass base by a spin coater so as to give a film thickness of 1 µm.

This base was then heated at 100° C. for 180 seconds on a hot plate to pre-cure the resist. The resist film thus formed was then subjected to proximity exposure system by means of a mask having a predetermined pattern and an i-ray exposure system and then developed by dipping it in a developing solution composed of an aqueous solution of an inorganic alkali, thereby forming a black matrix pattern. Thereafter, the pattern was regulated into a complete form while spraying purified water under high pressure to conduct a rinsing treatment. The thus-treated base was heated at 200° C. for 30 minutes in a clean oven to completely cure the resist.

After the above steps, the contact angle of the black matrix surface with water was measured and found to be 55°. On the other hand, the contact angle of the glass surface with water was 50°. Therefore, there was little difference in contact angle therebetween. At some places, the contact angle of the black matrix surface was smaller than that of the glass surface.

As a subsequent step, the surface of the glass base was subjected to an etching treatment by means of a reactive ion etching device. The etching conditions were as follows:

power input: 500 W $CF_4$: 20 SCCM treatment time: 5 minutes.

The etching depth under these conditions was about 0.12 µm.

After the etching, the contact angle of the black matrix surface with water was measured and found to be 52°. On the other hand, the contact angle of the glass surface with water was 8°, and so a difference in contact angle with water between both surfaces became greater.

Water-based inks each containing dyes of red, green and blue colors were then each applied to the space areas of the black matrix pattern using an ink-jet apparatus to color portions of the base surface corresponding to the space areas. These inks used were each prepared by dispersing a dye in a resin and dissolving this dispersion in a solvent. The inks had surface energy of 58 dyn/cm. The inks fully and evenly spread over the portions of the base surface corresponding to the space areas between the black matrices, and defective results such as bleeding, runout, color mixing between adjoining pixel areas and blank areas were not observed.

The thus-colored base was then subjected to a heat treatment to set the inks, and a protective film was applied thereto to form a transparent conductive film. The protective film was excellent in adhesion, and so no inconvenience arose.

The color filter thus produced was used to fabricate a liquid crystal display device illustrated in FIG. 2. As a result, a liquid crystal display device free of any defect and excellent in color properties was obtained.

EXAMPLE 13

After a glass base was subjected to an alkali cleaning treatment and then to a UV-ozone treatment, a resist material (a negative-type resist ink for black matrices, Color Mosaic CK-S 171, trade name, product of Fuji Hunt K.K.) comprising a black material was applied to the glass base by a spin coater so as to give a film thickness of 1 µm.

This base was then heated at 100° C. for 180 seconds on a hot plate to pre-cure the resist. The resist film thus formed was then subjected to proximity exposure system by means of a mask having a predetermined pattern and an i-ray exposure system and then developed by dipping it in a developing solution composed of an aqueous solution of an inorganic alkali, thereby forming a black matrix pattern. Thereafter, the pattern was regulated into a complete form while spraying purified water under high pressure to conduct a rinsing treatment. The thus-treated base was heated at 200° C. for 30 minutes in a clean oven to completely cure the resist.

After the above steps, the contact angle of the black matrix surface with water was measured and found to be 55°. On the other hand, the contact angle of the glass surface with water was 50°. Therefore, there was little difference in contact angle therebetween. At some places, the contact angle of the black matrix surface was smaller than that of the glass surface.

As a subsequent step, the surface of the glass base was subjected to an etching treatment by reverse sputtering. The reverse sputtering conditions were as follows:

power input: 800 W

Ar: 30 SCCM treatment time: 7.5 minutes.

The etching depth under these conditions was about 0.09 µm.

After the etching, the contact angle of the black matrix surface with water was measured and found to be 49°. On the other hand, the contact angle of the glass surface with water was 10°, and so a difference in contact angle with water between both surfaces became greater.

Water-based inks each containing dyes of red, green and blue colors were then each applied to the space areas of the black matrix pattern using an ink-jet apparatus to color portions of the base surface corresponding to the space areas. The inks used were the same as those used in Example 12 and had surface energy of 58 dyn/cm. The inks fully and evenly spread over the portions of the base surface corresponding to the space areas between the black matrices, and defective results such as bleeding, runout, color mixing between adjoining pixel areas and blank areas were not observed.

The thus-colored base was then subjected to a heat treatment to set the inks, and a protective film was applied thereto to form a transparent conductive film. The protective film was excellent in adhesion, and so no inconvenience arose. Namely, in this example, the pixel areas of the glass base surface can also be evenly colored with good reproducibility by etching those areas.

The color filter thus produced was used to fabricate a liquid crystal display device illustrated in FIG. 2. As a result, a liquid crystal display device free of any defect and excellent in color properties was obtained.

According to the present invention, color filters free of defects, irregularities and color mixing and high in contrast can be produced with ease without causing any ink cissing upon applying color inks to space areas between black matrices by ink-jet or the like to evenly color the space areas.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for producing a color filter, comprising the steps of:

forming a black matrix pattern with a resin on a transparent base;

conducting a surface-state-modifying treatment by alkali cleaning or corona discharge to increase surface energy of the surface of the base at areas corresponding to spaces of the black matrix pattern; and applying ink to the base at said areas corresponding to the spaces of the black matrix pattern.

2. The process according to claim 1, wherein the step including the corona discharge treatment is a step of conducting a corona discharge treatment, a heat treatment and a cleaning treatment.

3. A process for producing a color filter, comprising the steps of:

forming a black matrix pattern with a resin on a transparent base;

conducting a surface-state-modifying treatment to increase surface energy of the surface of the base at areas corresponding to spaces of the black matrix pattern;

applying ink to the base at said areas corresponding to the spaces of the black matrix pattern;

wherein the surface-state-modifying treatment is an etching treatment and the surface of the base is etched from 0.05 to 0.15 µm.

4. The process according to claims 1 or 3, wherein the step of forming the black matrix pattern is a step of exposing and patterning a black photosensitive resin composition.

5. The process according to claims 1 or 3, wherein the step of forming the black matrix pattern is a step of patterning a black nonphotosensitive resin composition using a photoresist.

6. The process according to claims 1 or 3, wherein the surface-state-modifying treatment is conducted in such a manner that a difference in contact angle with water between the black matrices and the surface of the base corresponding to the spaces partitioned by the black matrices amounts to at least 15°.

7. The process according to claim 1 or 3, wherein the surface-state-modifying treatment is conducted in such a manner that a difference in contact angle with water between the black matrices and the surface of the base corresponding to the spaces partitioned by the black matrices amounts to at least 40°.

8. The process according to claim 1 or 3, wherein the inks are applied by an ink-jet printing system.

9. The process according to claims 1 or 3, wherein the inks are thermosetting.

10. A process for producing a liquid crystal display device, comprising the steps of:

forming a color filter substrate via the steps of forming a black matrix pattern with a resin on a transparent base, conducting a surface-state-modifying treatment by alkali cleaning and corona discharge to increase surface energy of the surface of the base at areas corresponding to spaces of the black matrix pattern, and applying ink to the base at side areas corresponding to the spaces of the black matrix pattern;

arranging an opposite base having pixel electrodes in opposition to the color filter substrate; and enclosing a liquid crystal composition in a space between the color filter substrate and the opposite base.

11. The process according to claim 10, wherein the step including the corona discharge treatment is a step of conducting a corona discharge treatment, a heat treatment and a cleaning treatment.

12. A process for producing a liquid crystal display device, comprising the steps of:

forming a color filter substrate by forming a black matrix pattern with a resin on a transparent base, conducting a surface-state-modifying treatment to increase surface energy of the surface of the base at areas corresponding to spaces of the black matrix pattern, and applying ink to the base at said areas corresponding to the spaces of the black matrix pattern;

arranging an opposite base having pixel electrodes in opposition to the color filter substrate; and enclosing a liquid crystal composition in a space between the color filter substrate and the opposite base;

wherein the surface-state-modifying treatment is an etching treatment and the surface of the base is etched from 0.05 to 0.15 μm.

13. The process according to claims 10 or 12, wherein the step of forming the black matrix pattern is a step of exposing and patterning a black photosensitive resin composition.

14. The process according to claims 10 or 12, wherein the step of forming the black matrix pattern is a step of patterning a black nonphotosensitive resin composition using a photoresist.

15. A process for producing a liquid crystal display device, comprising the steps of:

forming a color filter substrate via the steps of forming a black matrix pattern with a resin on a transparent base, conducting a surface-state-modifying treatment by alkali cleaning or corona discharge to increase surface energy of the surface of the base at areas corresponding to spaces of the black matrix pattern, and applying ink to the base at said areas corresponding to the spaces of the black matrix pattern;

arranging an opposite base having pixel electrodes in opposition to the color filter substrate; and enclosing a liquid crystal composition in a space between the color filter substrate and the opposite base.

16. The process according to claims 10 or 12, wherein the surface-state-modifying treatment is conducted in such a manner that a difference in contact angle with water between the black matrices and the surface of the base corresponding to the spaces partitioned by the black matrices amounts to at least 40°.

17. The process according to claims 10 or 12, wherein the inks are applied by an ink-jet printing system.

18. The process according to claims 10 or 12, wherein the inks are thermosetting.

* * * * *

UNITED STATES PATENT AND TRADEMARK OFFICE
CERTIFICATE OF CORRECTION

PATENT NO.     : 6,042,974
DATED          : March 29, 2000
INVENTOR(S)    : Kenichi Iwata et al.

It is certified that error appears in the above-identified patent and that said Letters Patent is hereby corrected as shown below:

Title Page:
Insert: -- [*] Notice: This patent issued on a continued prosecution application filed under 37 CFR 1.53 (d), and is subject to the twenty year patent term provisions of 35 U.S.C. 154 (a) (2).--.

[56] References Cited under FOREIGN PATENT DOCUMENTS

"4121702" should read --4-121702 --;
"6347637 12/1994 Japan." should be deleted;
"7035915" should read -- 7-035915 --; and
"7035917" should read -- 7-035917 --.

Column 5:
Line 11, "become" should read -- became --.

Column 6:
Line 21, "tends" should read -- tend --.

Column 7:
Line 18, "become" should read -- became --.

Column 9:
Line 15, "thermosetting" should read -- thermosetting --.

Column 11:
Line 57, "a" should read -- an --.

Column 12:
Line 32, "become a state" should read -- became --.

Column 13:
Line 35, "filled in only" should read -- restricted to --; and
Line 50, "become a state" should read -- became --.

Column 14:
Line 16, "become a state" should read -- became --.

UNITED STATES PATENT AND TRADEMARK OFFICE
CERTIFICATE OF CORRECTION

PATENT NO.   : 6,042,974
DATED        : March 29, 2000
INVENTOR(S)  : Kenichi Iwata et al It is certified that error appears in the above-identified patent and that said Letters Patent is hereby corrected as shown below:

Column 15:
Line 10, "become a state" should read -- became --.

Column 18:
Line 8, "pattern;" should read -- pattern; and --;
Line 9, "pattern;" should read -- pattern,--;
Line 26, "claim" should read -- claims --;
Line 32, "claim" should read -- claims --;
Line 41, "and" should read -- or --;
Line 44, "side" should read -- said --; and
Line 66, "base;" should read -- base, --.

Columns 19-20:
Line 11-6, Claim 15 should read -- 15. The process according to claims 10 or 12, wherein the surface-state-modifying treatment is conducted in such a manner that a difference in contact angle with water between the black matrices and the surface of the base corresponding to the spaces partitioned by the black matrices amounts to at least 15° --.

Signed and Sealed this

Fourteenth Day of August, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO. : 6,042,974                                                                   Page 1 of 1
DATED : March 29, 2000
INVENTOR(S) : Kenichi Iwata et al.

It is certified that error appears in the above-identified patent and that said Letters Patent is hereby corrected as shown below:

<u>Columns 19-20,</u>
Lines 6-11, Claim 15 should read -- 15. The process according to claims 10 or 12, wherein the surface-state-modifying treatment is conducted in such a manner that a difference in contact angle with water between the black matrices and the surface of the base corresponding to the spaces partitioned by the black matrices amounts to at least 15° --.

Signed and Sealed this

Twenty-fifth Day of December, 2001

Attest:

JAMES E. ROGAN
*Attesting Officer*            *Director of the United States Patent and Trademark Office*